US012689499B2

(12) United States Patent
Fornaciari et al.

(10) Patent No.: US 12,689,499 B2
(45) Date of Patent: Jul. 21, 2026

(54) COMPUTING PLATFORM FOR PREVENTING SIDE CHANNEL ATTACKS

(71) Applicant: Politecnico di Milano, Milan (IT)

(72) Inventors: William Fornaciari, Parma PR (IT); Davide Zoni, Piacenza PC (IT)

(73) Assignee: Politecnico di Milano, Milan (IT)

( * ) Notice: Subject to any disclaimer, the term of this patent is extended or adjusted under 35 U.S.C. 154(b) by 581 days.

(21) Appl. No.: 18/008,207

(22) PCT Filed: Jun. 1, 2021

(86) PCT No.: PCT/EP2021/064711
§ 371 (c)(1),
(2) Date: Dec. 5, 2022

(87) PCT Pub. No.: WO2021/245101
PCT Pub. Date: Dec. 9, 2021

(65) Prior Publication Data
US 2023/0318802 A1     Oct. 5, 2023

(30) Foreign Application Priority Data

Jun. 5, 2020     (IT) ........................ 102020000013390

(51) Int. Cl.
*H04L 9/00*          (2022.01)
(52) U.S. Cl.
CPC .............. *H04L 9/005* (2013.01); *H04L 9/003* (2013.01)
(58) Field of Classification Search
CPC ................................ H04L 9/005; H04L 9/003
See application file for complete search history.

(56) References Cited

U.S. PATENT DOCUMENTS 5,649,160 A * 7/1997 Corry ..................... H04B 15/04
                                                        711/167
2010/0223434 A1* 9/2010 Dupaquis ............ G06F 9/30043
                                                        711/E12.001

(Continued)

FOREIGN PATENT DOCUMENTS

CN          103634102 A      3/2014

OTHER PUBLICATIONS

International Search Report, Written Opinion dated Jun. 30, 2021; App No. PCT/EP2021/064711.

(Continued)

*Primary Examiner* — Dhairya A Patel
*Assistant Examiner* — Eui H Kim
(74) *Attorney, Agent, or Firm* — Rankin Hill & Clark, LLP; Erik J. Overberger

(57) ABSTRACT

The present disclosure relates to a computing platform for preventing side channel attacks comprising a memory module configured for storing data of a computer program and program instructions; a pipeline having a plurality of stages, said plurality of stages being configurated for transferring electrical signal via a on-chip interconnect bus; a CPU configured for executing said computer program; said program instructions being decoded by one stage of said plurality of stages; each stage of said pipeline having at least one combinatorial module, said at least one combinatorial module having a plurality of data input and a plurality control input and at least a data output; each program instruction traveling from left to right through said pipeline, and within each stage can activate one or more or none of said at least one combinatorial module. The computing platform comprises a plurality digital logic means interconnected to each other's and configured for generating random values or program data values, said plurality of digital logic (Continued)

means being in communication signal with said plurality of data input of said combinatorial module, so as when said program instruction enters one stage of said plurality of stages, all the combinatorial modules of said that stage that are not activated by the program instruction will have their input data fed with said random values and all the combinatorial modules of said that stage that are activated by said program instruction will have their unused data input fed with said random values and their used data inputs fed with said program data values.

14 Claims, 6 Drawing Sheets

(56) References Cited

U.S. PATENT DOCUMENTS

| | | | | |
|---|---|---|---|---|
| 2010/0312997 | A1* | 12/2010 | Walker | G06F 9/3001 |
| | | | | 711/105 |
| 2011/0156756 | A1* | 6/2011 | Bancel | H03K 19/003 |
| | | | | 326/104 |
| 2012/0124393 | A1* | 5/2012 | Sethumadhavan | H04L 9/008 |
| | | | | 726/36 |
| 2016/0103626 | A1* | 4/2016 | Hars | G06F 21/556 |
| | | | | 711/103 |
| 2016/0371065 | A1* | 12/2016 | Venkatasubramanian | |
| | | | | G06F 11/3466 |
| 2017/0115986 | A1* | 4/2017 | Jorgensen | G06F 7/49947 |
| 2017/0116070 | A1* | 4/2017 | Alrod | G11C 16/26 |
| 2017/0288855 | A1* | 10/2017 | Kumar | H04L 9/003 |
| 2018/0164845 | A1* | 6/2018 | Christiansen | G06F 13/4295 |
| 2019/0294443 | A1* | 9/2019 | Navada | G06F 9/45516 |
| 2020/0110906 | A1 | 4/2020 | Choi et al. | |
| 2020/0175162 | A1* | 6/2020 | Saab | H04L 63/1441 |

OTHER PUBLICATIONS

Chen et al; "Countermeasures Against Information Leakage Induced by Data Serialization Effects in a RISC CPU"; Serialization Effects in a RISC CPU11 , Proceedings of the 4th International Conference on Computer Science and Application Engineering, Oct. 20, 2020 (Oct. 20, 2020), pp. 1-7, XP055817043, New York, NY, USA.

* cited by examiner

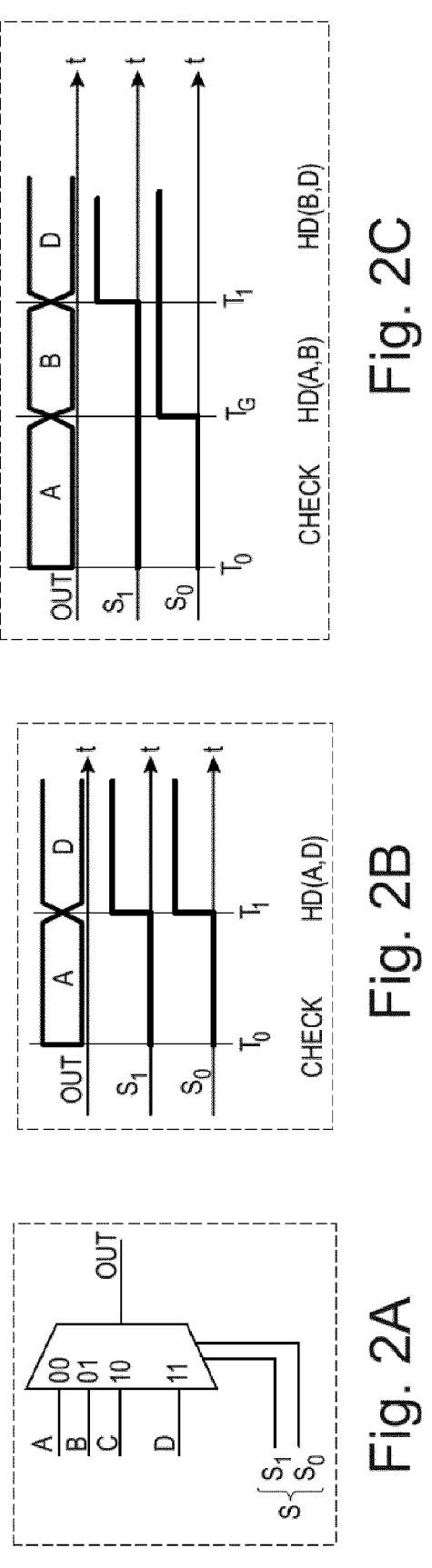
Fig. 2A
Fig. 2B
Fig. 2C
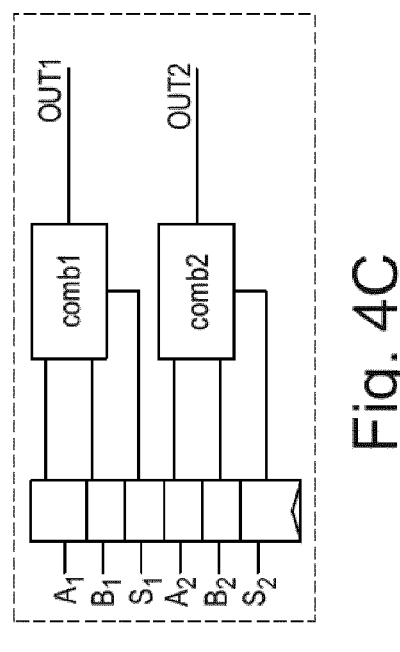
Fig. 4C
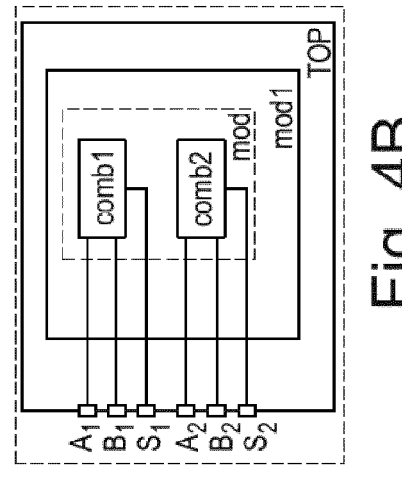
Fig. 4B
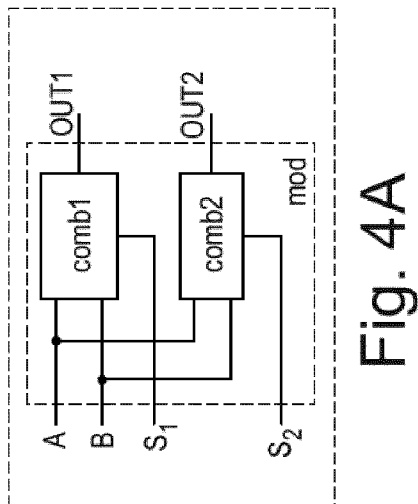
Fig. 4A

COMPUTING PLATFORM FOR PREVENTING SIDE CHANNEL ATTACKS

TECHNICAL FIELD

The present disclosure is related to a computing platform for preventing side channel attacks, according to the preamble of claim 1.

STATE OF THE ART

Side-channel attacks (SCAs) represent one of the most significant threats to the security of embedded systems, which oversee an increasing number of tasks in the modem, deeply interconnected era.

In computer security, a side-channel attack is any attack aimed at retrieving the secret key of the cryptographic primitive.

Rather than exploiting any weaknesses in the mathematical formulation, i.e., the algorithm, of the crypto-system, the side-channel attacks rely on the relationship between information emitted (leaked) through a side channel and the data being computed.

Depending on the attack methodology, side-channel attacks are split in two classes, i.e., i) microarchitectural-based and ii) emission-based SCAs.

Microarchitectural-based SCAs do not require physical proximity to the platform while malicious or cooperating spy applications must be collocated/executed on the same platform with the victim application.

In contrast, emission based SCAs require physical proximity to the target device without the need of executing any spy application on such target. Emission-based side channel attacks (SCAs), also known as passive non-invasive attacks, measures the execution time or the power consumption, or the electromagnetic field of the victim device without permanently altering it, and therefore they leave no evidence of an attack behind.

Traditionally, cryptographic primitives and protocols have proven to be the prime means to provide the aforementioned security features in an effective and efficient way.

However, the security-oriented design for the embedded systems in the IoT era must take into account both the mathematical strength and the resistance against SCAs of the employed cryptographic primitives and protocols.

In particular, the IoT revolution delivers a digital world made of billions of interconnected devices that are constantly collecting processing and transmitting streams of data where some of them are private or sensitive.

Thus, critical computations or processing of critical data is not supposed to happen in physically secured High Performance Computing (HPC) or Datacenters premises but is delegated to IoT devices for which no physical protection from any attacker is provided.

In this scenario, side-channels attacks allow to retrieve the secret key even in presence of a mathematically secure cryptographic primitive or protocol, since they work by correlating the data being processed and one environmental parameter, i.e., the side-channel, generated by the computing platform during the execution of the cryptographic primitives.

In particular, a successful side-channel attack exploits the possibility to physically seize the target device to measure the selected side-channel signal.

To exfiltrate valuable information from a computing platform executing a cryptographic primitive, the literature highlights several exploitable side-channels, e.g. timing, light, and heat.

The power consumption or the related Electromagnetic (EM) emissions of the computing platforms emerged as the most exploited side-channel signals since they are easy to measure and always available once the attacker physically controls the device.

Considering the computing platform, it is well known that both the EM and the power consumption signals correlates with the coarse grained power attack models which measures the Hamming Weight (HW) of a data value driven on a physical wire or the Hamming Distance (HD) of two data values that are consecutively serialized onto the same physical wire.

With reference to FIG. 1A, it is shown a method to secure software implementations of cryptographic primitives on low-end embedded systems, against passive side channel attacks, i.e., differential power analysis (DPA), relying on the observation of power consumption or electromagnetic emissions (more details can be found on the publication "G. Agosta, A. Barenghi, G. Pelosi and M. Scandale, *"The MEET Approach: Securing Cryptographic Embedded Software Against Side Channel Attacks*," in *IEEE Transactions on Computer-Aided Design of Integrated Circuits and Systems*, vol. 34, no. 8, pp. 1320-1333, August 2015, doi: 10.1109/TCAD.2015.2430320").

The proposed method of FIG. 1A is implemented at software level and consists of three parts. First, a modified compiler toolchain is used to automatically generate a secure binary of the cryptographic primitive by randomizing the execution flow. Second, a new method to refresh the random values employed in the share splitting approaches to lookup table protection. Finally, an automated approach to protect spill actions onto the main memory, which are inserted by the compiler backend register allocator when there is a lack of available registers, thus, removing the need for manual assembly inspection.

These software countermeasures deliver low performance and they must be implemented for any executed cryptographic application thus enforcing long development cycles for protecting new algorithms.

With reference to FIG. 1B, it is shown an actuator-based countermeasures to secure a computing platform from side-channel attacks by leveraging the dynamic voltage scaling (DVS) actuator (more details can be found on the publication "K Baddam and M. Zwolinski, *"Evaluation of Dynamic Voltage and Frequency Scaling as a Differential Power Analysis Countermeasure,"* 20th International Conference on VLSI Design held jointly with 6th International Conference on Embedded Systems (*VLSID'07*). Bangalore, 2007, pp. 854-862, doi: 10.1109/VLSID.2007.79"). To break the link between the power consumption or the electromagnetic emissions and the data being processed by the computing platform, the countermeasures generates random fluctuations of the supply voltage. To this end the countermeasure enforces a time-dependent power consumption for the execution of the same instructions with the same program data.

These actuator-based countermeasures have the drawbacks that the computing platform must implement the DVS. Xilinx FPGAs only implements the dynamic frequency scaling actuator. Moreover, the DVS is generally employed to support run-time efficiency optimizations. To this end, the use of the DVS actuator to secure the computing platform prevent any DVS-based efficiency optimization at run-time With reference to FIG. 1C, it is shown an accelerator-based countermeasure (more details can be found on the publication "Hannes Gross, Stefan Mangard, and Thomas Korak 2016. *Domain-Oriented Masking: Compact Masked Hardware Implementations with Arbitrary Protection Order In Proceedings of the* 2016 *ACM Workshop on Theory of Implementation Security* (*TIS* '16). *Association for Computing Machinery*. New York, NY, USA, 3. DOI:https://doi.org/10.1145/2996366.2996426").

The accelerator ACC is hardware implemented and is used to perform side-channel resistant cryptographic computations as a standalone component or as part of a complex computing platform as the one in FIG. 1C.

Traditionally, the use of side-channel resistant hardware implementations of standard cryptographic primitives represents a viable solution to deliver side-channel security. Compared to general purpose computing platforms, the accelerator implements a single algorithm thus the process of securing its implementation from side-channel attacks is relatively simple.

These accelerator-based countermeasures have the drawbacks of protecting specific implementations and therefore there is a lack of flexibility in terms of used algorithms, the impossibility to update protected hardware implementations, and long development cycles for protecting new algorithms. Furthermore, cryptographic algorithms are usually just one part of an embedded system that operates on informational assets. Protecting only this part of a system is thus not sufficient for most security critical embedded applications.

With reference to FIG. 1D, it is shown a secure general-purpose computing platform leveraging masking schemes (more details can be found on the publication "Gross H., Jelinek M., Mangard S., Unterluggauer T. Werner M. (2017) *Concealing Secrets in Embedded Processors Designs*. In: Lemke-Rust K., Tunstall M. (eds) *Smart Card Research and Advanced Applications. CARDIS* 2016. *Lectue Notes in Computer Science*, vol 10146. Springer: Cham, doi https://doi.org/10.1007/978-3-319-54669-8"). This secure general-purpose computing platform presents a side-channel resistant computing platform employing the domain-oriented masking scheme presented in "Hannes Gross, Stefan Mangard and Thomas Korak 2016. *Domain-Oriented Masking: Compact Masked Hardware Implementations with Arbitrary Protection Order In Proceedings of the* 2016 *ACM Workshop on Theory of Implementation Security* (*TIS* '16). Association for Computing Machinery. New York NY, USA, 3. DOI:https://doi.org/10.1145/2996366.2996426").

It is to be noted that this contribution to the state of the art does not show how to secure the entire computing platform, but only the CPU.

It is also to be noted that the act of observing two data values that are consecutively serialized on the same physical wires is known as the data-serialization effect. Considering a computing platform executing a computer program by means of a programmable CPU, the data serialization effect can be due to i) the execution of two consecutive instructions that are consecutively serializing two data values, i.e., one for each instruction, on the same physical wire, or ii) the glitching behavior of the microarchitecture when a single instruction of the computer program is executed. It is worth noticing that the glitching behavior is a property of the implemented computing platform that takes step from the impossibility of having the same propagating delay for all the input signals of a combinatorial logic block.

Considering digital circuits, the propagation delay is split between interconnect (propagation) delay and gate/logic (propagation) delay. The interconnect delay measures the time from the initial driving of a data value onto a physical wire and its arrival in the other end of such wire. Given a logic gate, its propagation delay measures the time from the stable value of its input to the transition of its output.

To this end, also with reference to FIGS. 2A, it is shown a four-input A, B, C and D combinatorial module such as a multiplexer MUX, having a selector signal S with two-bit, i.e. S0, S1. The two-bit S0, S1 of the selector signal S are used to drive one of the four inputs A, B, C and D to an output OUT. The multiplexer MUX implements a combinatorial circuit.

It is worth noticing that if the combinatorial module MUX implements a single Boolean function the S signal is not required. In general, the S signal is used to specify either a multiplexing/demultiplexing (MUX) or an opcode function (OPCODE).

Considering a combinatorial module implementing multiple Boolean functions, e.g., an Arithmetic Logic Unit (ALU) in a computing platform CPU, the OPCODE function for signal S specifies to the combinatorial module to perform a specific processing of the input data value among all the implemented input data processing functionalities.

Now, again with reference to FIG. 2A and assuming that the temporal evolution of the data requires the following:

at time T0 the output OUT is equal to the input A being the logic value of the selector S0 equal to zero as well as for the selector S1, i.e. equal to zero and at the time T1 the output OUT is equal to the input D being the logic value of the selector S0 equal to one as well as for the selector S1, i. e. equal to one, There is a difference between the ideal and real evolution of the transitions of the output OUT from time T0 to time T1. This due to the presence of glitches caused by the physical implementation of the combinatorial module.

In fact, with reference to FIG. 2B, it is shown the temporal evolution of the signals of interests, i.e., OUT and S0, S1, between the time instants T0 and T1 in the ideal scenario. As shown, the transition of all the signals and values is instantaneous and perfectly aligned.

On the contrary, and with reference to FIG. 2C, it is shown the same temporal evolution considering the propagation delay due to the physical implementation of the considered multiplexer. In particular, at time $T_G$, the selector S0 shows a smaller propagation delay than selector S1. Thus, the actual series of data values driven onto the OUT signal is A=>B=>D.

As expected, the final value D demonstrates a correct semantic of the circuit, but, from a security standpoint, two transitions must be analyzed for side-channel information leakage rather than a single one.

Considering no propagation delay (see FIG. 2B), the security analysis requires to analyze the side-channel vulnerability accounting for the relative power consumption variation due to the switching activity equal to the Hamming distance (HD) between A and D, i.e., HD(A,D).

Further, it is well known that both the EM and the power consumption signals correlate with the coarse grained power attack models which measures the Hamming Weight (HW) of a data value driven on a physical wire or the Hamming Distance (HD) of two data values that are consecutively serialized onto the same physical wire.

As known, the Hamming Distance measures the number of bit flips between two values driven or stored in consecutive clock cycles on wires or memory elements, respectively. Such a model requires the attacker to have further information with respect to one obtainable simply predicting an intermediate value of the algorithm. In particular, the attacker should be aware of the detailed microarchitecture of the target computing platform and for each wire (memory element) the exact sequence of data values driven (stored) on it.

However, given the fact that, in practice, the attacker may not be knowing the structure of the device being targeted with a precision sufficient to determine which combinatorial and which sequential elements are present, an alternate power consumption model commonly employed is the Hamming Weight (HW) of an intermediate value being computed by the algorithm. This model is intended to capture the power dissipated by logic gates in charging their fan-out and is defined in literature as value leakage. In particular, given a logic circuit computing a value, its value leakage is defined as the portion of the side channel behavior depending on the number of signals being set during the aforementioned computation, i.e., the Hamming weight of the computed value.

In contrast, the real scenario considering the propagation delay (see FIG. 2C) imposes to analyze the Hamming Distance between the values A and B and also between the values B and D, i.e. in short form HD(A,B), HD(B,D).

It is worth noticing that it is impossible to foresee the propagation delay of each signal in a digital circuit, thus the number of possible glitches increases with the complexity of the combinatorial device.

From document WO 2017/105606, it is also known the use of a "cleaner" to prevent sensitive data sent consecutively through potentially vulnerable resources from maintaining possible statistical correlations. The described solution also refers to the coordinated use of the compiler to insert "cleaning" operations at appropriate points in the execution of the code.

However, the document WO 2017/105606 this technique does not protect against glitch vulnerabilities.

Problem of the Prior Art

Given a combinatorial module driving the single-bit w wire, the glitch on w is a short-lived transition of the driven data value on w due to the different timing of the paths composing the combinatorial module. In particular, a faster combinational path can provoke a sequence of consecutive data updates on the w even if the final, i.e., stable, driven value is the semantically correct one for the designed combinational circuit.

The glitches greatly contribute to the power consumption of digital CMOS logic thus must be accounted in the design of microarchitectural level SCA countermeasures.

Scope of the Disclosure

In this context, the technical object of the present disclosure is to provide a computing platform able to overcome the limitations and the drawbacks of the state-of-the-art approaches heretofore described.

The specified technical object and the specified aims are substantially achieved by a computing platform for preventing side channel attacks comprising the technical characteristics described in one or more of the appended claims.

6

Advantages of the Disclosure

Thanks to the computing platform according to the present disclosure, it is possible protect the entire computing platform from side channel attacks, in a fully transparent manner with respect to the computer program to ensure full scalability and flexibility. Hence any modification of the computer program will not impact on the resistance to side channel attacks.

Further, thanks to the computing platform of the present disclosure it is possible to solve the problem of glitches that could cause side-channel information leakage in the case the computing platform uses only one program instruction by inserting at the hardware level, in a completely transparent way to the computer program since changes are internal to the computing platform, of the appropriate instructions that decorrelate the energy consumption with respect to the processing of the key carried out in the crypto-primitives.

Further, thanks to the computing platform of the present disclosure it is possible to solve the problem of data serialization of a pair of program instructions that are executed consecutively, as well as the data serialization due to two consecutive writes of program data in the same memory cell, by morphing the executed instructions. In particular, additional, ad-hoc, legal ISA instructions are created in the decoding stage so as to destroy the data serialization.

Moreover, a specific morphing behavior that changes the actually executed program instructions still ensuring the same semantic of the original computer program is adopted to prevent any side-channel information leakage of load and store instructions.

BRIEF DESCRIPTION OF THE DRAWINGS

Further characteristics and advantages of the present disclosure will appear more clearly from the indicative, and therefore non-limiting, description of a preferred but not exclusive embodiment of the computing platform as illustrated in the enclosed drawings in which:

FIG. 2A shows a multiplexer with four data inputs, i.e., A, B, C, and D, a selector input, i.e., S, and an output, i.e., OUT, according to the prior art;

FIG. 2B shows the temporal evolution of the signals of interests of the multiplexer of FIG. 2A in the ideal case;

FIG. 2C shows the temporal evolution of the signals of interests of the multiplexer of FIG. 2A in the real case;

FIG. 4A shows a block diagram of two combinatorial modules, according to the prior art;

FIGS. 4B-4C show the block diagram of FIG. 3A where the shared data inputs have been physically decoupled, according to the present disclosure;

DETAILED DESCRIPTION

Even when this is not expressly stated, the individual features as described with reference to the particular embodiments shall be intended as auxiliary to and/or interchangeable with other features described with reference to other exemplary embodiments.

Herein below some definitions are provided for sake of clarity of the detailed description.

The Sequential logic defines a type of digital logic circuit whose output depends not only on the present value of its input signals but on the sequence of past inputs, the input history as well.

Considering a programmable computing platform, the inter-stage register, the register file RF are sequential elements. Moreover, the memory is a sequential element in the computing platform.

The combinatorial module defines a type of digital logic circuit whose output is a pure function of the present input only.

The Boolean function is a function in mathematics and logic whose arguments, as well as the function itself, assume values from a two-element set (usually $\{0,1\}$). In general, the Boolean function is defined by means of the truth table which specifies for each combination of the input values the output of the function.

The Boolean expression defines one possible implementation of a given Boolean function by means of logic gates. It is worth noticing that a Boolean function can be implemented by an infinite number of Boolean expressions. For example, given a Boolean function defined by its truth table, the first canonical form, i.e., sum of products, defines the Boolean expression by only leveraging AND, OR, and NOT gates.

A random value is a non-sensitive data generated by the countermeasure and used to separate the serialization of two data (D) or one data (D) and one reference (REF), appearing in any order, that are consecutively driven on the same wire or consecutively stored in the same memory element.

Program data value is any piece of information, possibly sensitive, processed by the computing platform during the execution of the target application, i.e., the cryptographic primitive from which the attacker is willing to retrieve the secret key. The result of the processing of a data is still a data.

Boolean masking—Given a program data value VAL its Boolean masking with two shares is defined by the pair of data values (A,B) where A=VAL xor RNG, B=RNG and RNG a uniformly distributed data value, e.g., a random value. A and B are called shares of VAL [1] (see for more detail Jean-Sébastien Coron, Alexei Tchulkine, "*A New Algorithm for Switching from Arithmetic to Boolean Masking*", CHES 2003, pp. 89-97, Lecture Notes in Computer Science book series (LNCS, volume 2779)).

Figures 1A, 1B, 1C, 1D:
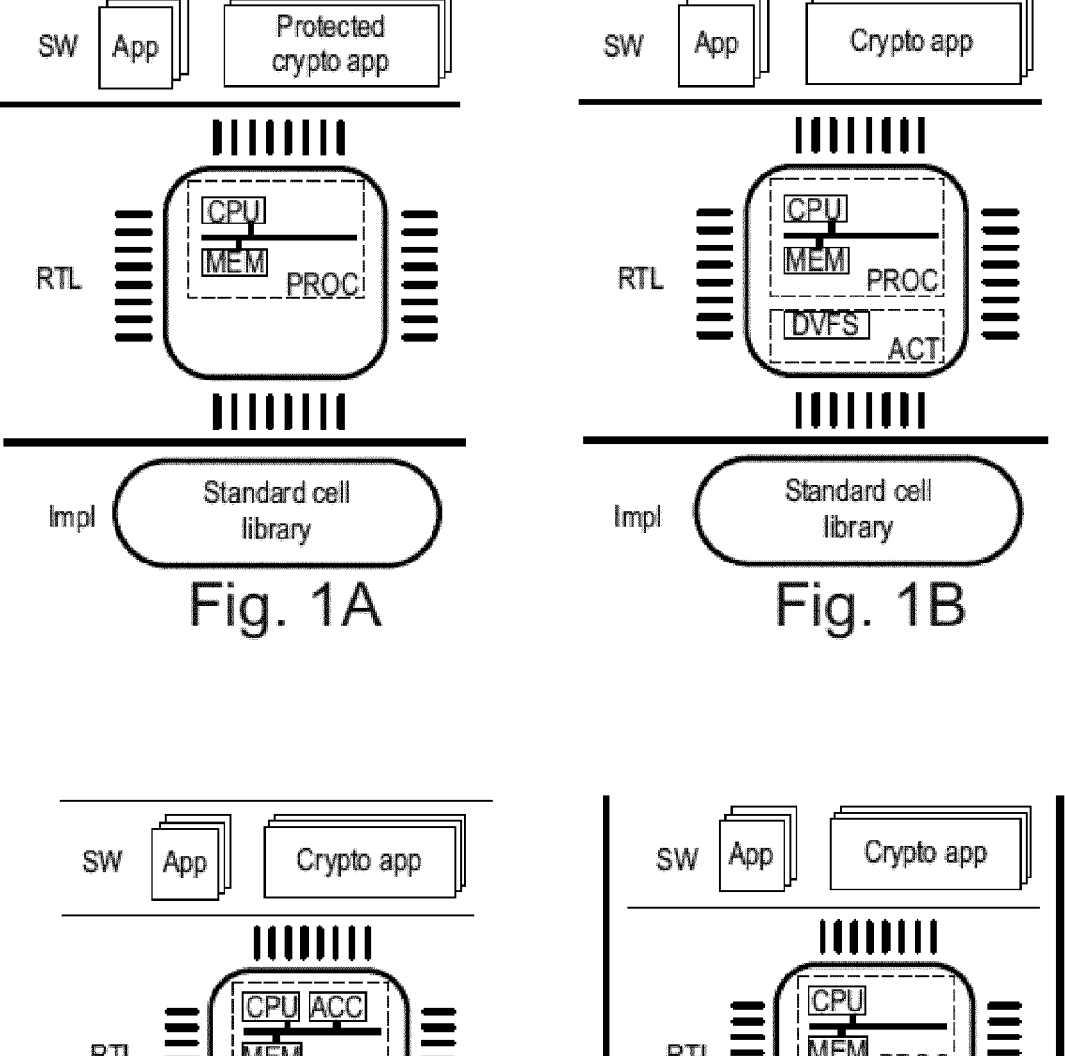
FIGS. 1A-1D show the countermeasures in the state-of-the-art classified in four sets according to the level of their implementation in the hardware-software stack, according to the prior art.
Figure 3:
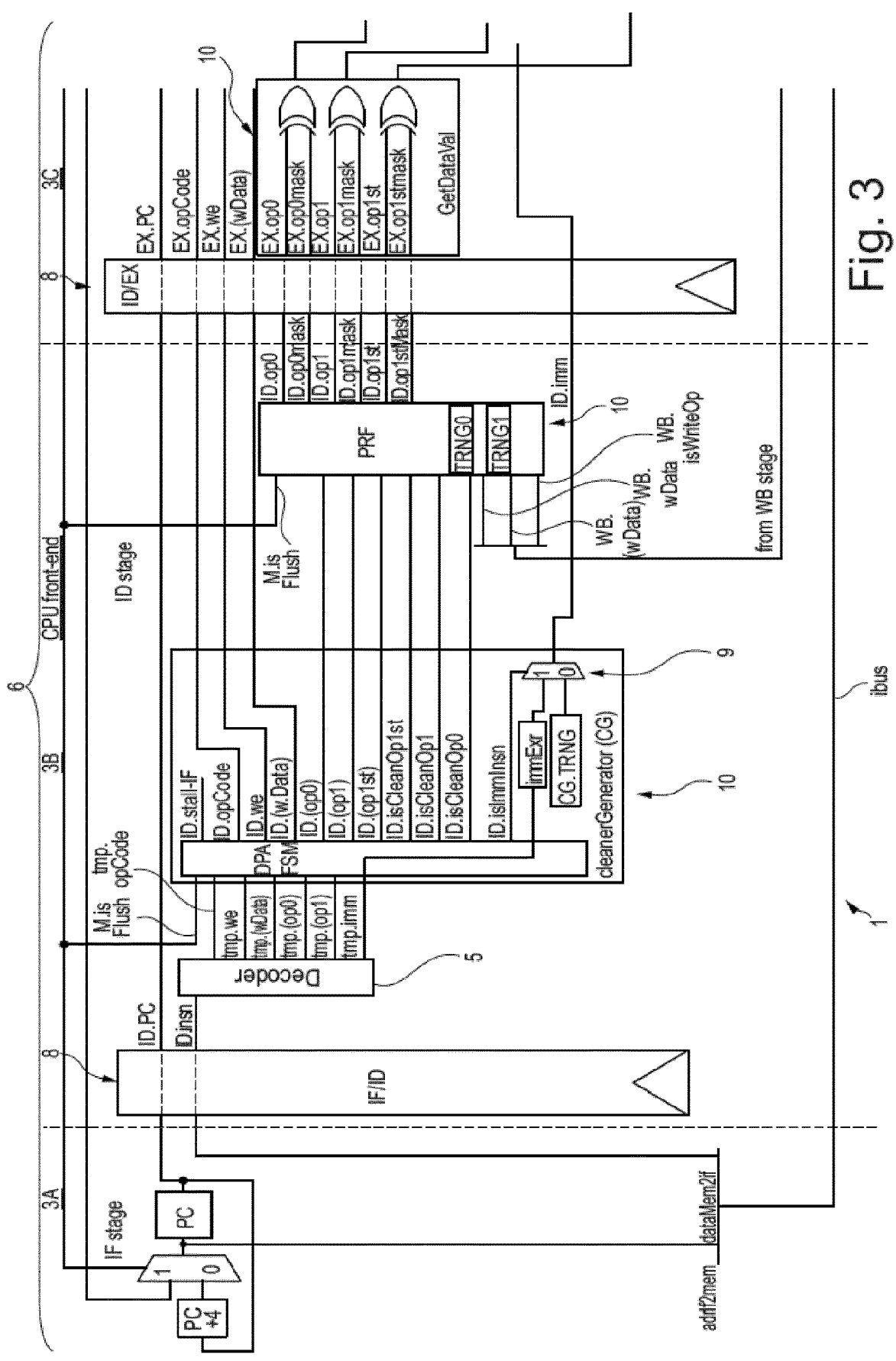
FIG. 3 shows the schematic of a computing platform as modified according to the present disclosure.
Figure 3:
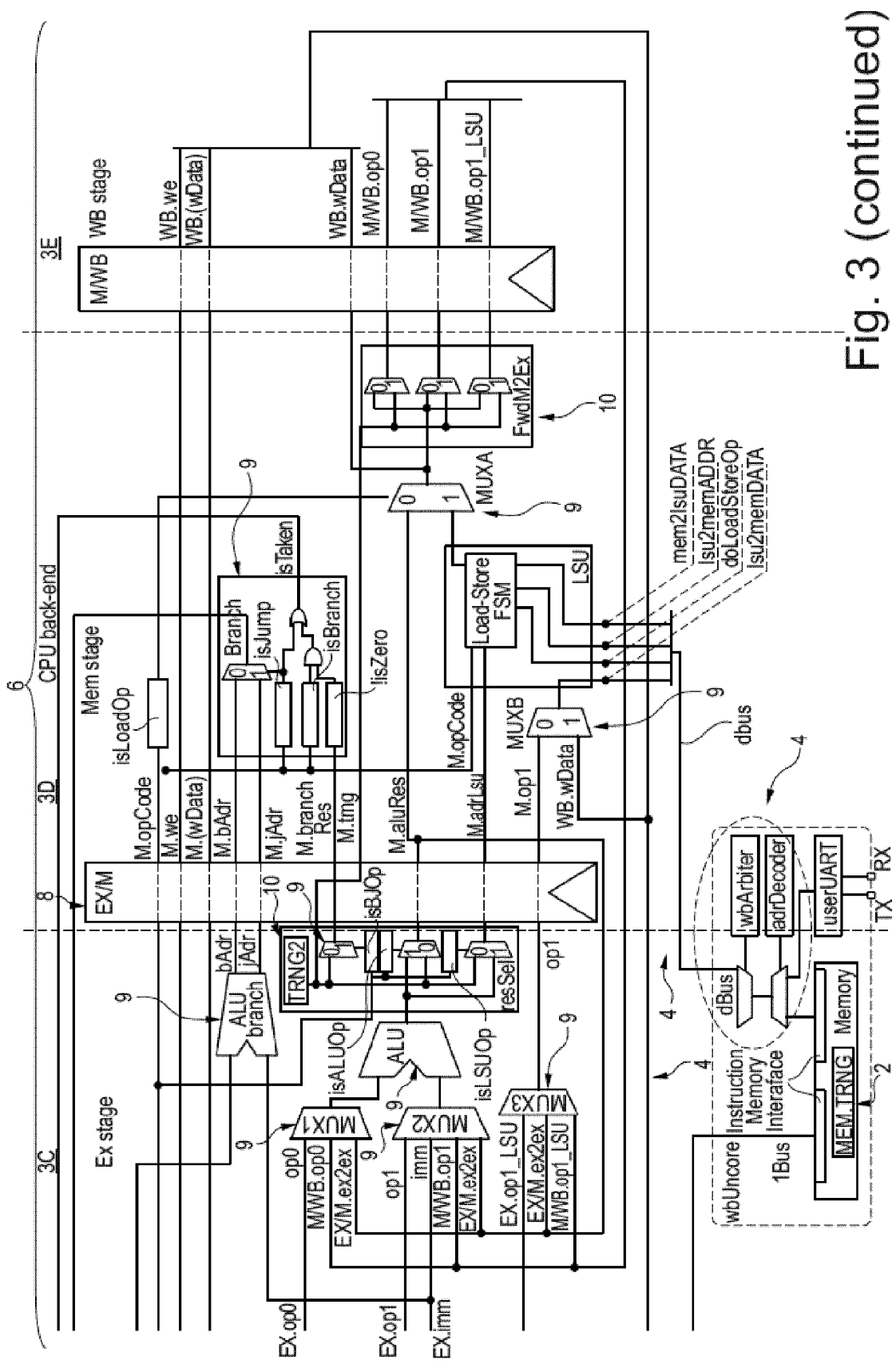

Now with reference to FIG. 3, a computing platform 1 for preventing side channel attacks according to the present disclosure is shown.

In the following description, only the digital circuits as well as the physical connection among said digital circuits that are relevant for the disclosure will be described.

The digital circuits not described in the description but reported in FIG. 3 are directly and unambiguously derivable for a skilled man in the art.

The computing platform 1 is a digital circuit that allows to execute computer programs.

In particular, the computing platform 1 comprises a plurality of physical components such as a memory 2 which stores data and instructions of a computer program, The computing platform 1 comprises a pipeline having a plurality of stages 3A-3E, which are configurated for transferring electrical signal via an on-chip interconnect bus 4.

In particular, the plurality of stages 3A, 3E comprises a decoding stage 3B configured for decoding a program instruction, an execution stage 3C configured for executing the decoded program instruction and a memory stage 3D to load and store program data values.

The embodiment shown in FIG. 3 depicts a five-stage pipeline, but the disclosure is not limited at this number of stages since the disclosure can be implemented also in computing platform having a single stage or number of stages greater than five stage.

The stages 3A-3E of the embodiment shown in FIG. 3 are the well-known stages, i.e. the Instruction Fetch stage IF, indicated with the reference 3A, the Instruction Decode stage ID, indicated with the reference 3B, the Execute stage EX, indicated with the reference 3C, the Memory access stage MEM, indicated with the reference 3D and the write back stage WB, indicated with the reference 3E.

As shown in FIG. 3, each stage 3A-3E is coupled with the next stage by a pipeline register 8. For example, the stage 3A is coupled with its next stage 3B by the pipeline register IF/ID, the stage 3B with its next stage 3C by the pipeline register ID/EX, the stage 3C with its next stage 3D by the pipeline register EX/M and the stage 3D with its next stage 3E by the pipeline register M/WB.

The plurality of stages 3A-3E are configured for transferring electrical signal representative of the data and instructions of the computer program via physical wires.

It is to be noted that one stage 3B of the plurality of stages 3A-3E is configured for decoding the program instructions.

The decoding stage 3B decodes the incoming instruction and it generates the control signals to be used by each subsequent stage of the CPU pipeline to process the program instruction.

It shall point out that according to the embodiment of FIG. 3 the stage 3A, i.e. the IF stage, is not affected by the countermeasure. This is because the program data (those that can create security problems) begin to circulate in the pipeline from stage 3B.

The on-chip interconnect bus 4 comprises an ibus for the stage 3A, a dbus for the stage 3D and arbitrary circuit wbArbiter, adrDecoder.

The computing platform 1 comprises also a debugger module 5.

The debugger 5 is used to communicate between the computing platform and a host computer (not shown).

The debugger 5 is attached as a second master, to the dbus to load the binary into the memory 2 and to inspect it.

The debugger logic and connections are not shown in FIG. 3, since they are not affecting the validity of the proposed countermeasure.

The computing platform 1 comprises also a CPU 6 configured for executing the computer program.

The computer program is a collection of instructions that can be executed by the CPU 6 so as the computing platform 1 can perform a specific task.

All the computer programs presented to the CPU 6 for execution must be coded using the Instruction Set Architecture (ISA) of that CPU.

The generic Instruction Set Architecture (ISA) of the CPU 6 can be classified in four classes, i.e., ALU, LOAD, STORE, BRANCH/JUMP.

In particular, each class can show different subclasses, i.e., the ALU class has three subclasses, ALU-R, ALU-I and ALU-PROP.

The CPU 6 is a programmable CPU. By way of example the CPU 6 of the computing platform 1 can be a CISC or RISC architectures or other similar architecture.

According to the imposed program counter PC, the CPU 6 fetches the corresponding instruction from the memory 2.

The CPU 6 can fetch one instruction per clock cycle, at most, and the entire CPU 6 is stalled until when the requested instruction is not forwarded from the main memory to the IF stage.

In general, only a fraction of the combinatorial modules and wires within a pipeline stages are used to process the instruction traversing said pipeline stage.

The computing platform 1 comprises a UART peripheral 7 used to handle the input and output of the computer program.

It is to be noted that each stage 3A-3E of said pipeline has at least one combinatorial module 9.

Said combinatorial module 9 has a plurality of data input, a plurality control input and at least a data output.

It is to point out that each program instruction travels from left to right through the pipeline, and within each stage can activate one or more or none of said at least one combinatorial module 9.

For example, in the stage 3C, i.e. EX stage, has the combinatorial modules MUX1, MUX2, MUX3, ALU, ALU branch and so on.

Each program instruction travels from left to right through the pipeline, and within each stage 3A-3E can activate one or more or none of said at least one combinatorial module 9.

In other words, given a program instruction, its semantic defines the functional units used for each pipeline stage of the CPU 6.

It is to be noted that the program instructions are stored in memory 2.

Obviously, not all the stored program instructions are executed but only the one that it necessary executing according to the computer program.

Each program instruction within each stage 3A-3E can activate one or more or none of the combinatorial module 9 herewith present.

To this end, each part of the CPU 6 in each stage 3A-3E can be classified as either activated ACTIVE or not NOT-ACTIVE depending on the executed instruction class.

In other words, an incoming program instruction when enters in a stage 3A-3E in function of its value, depending from decoding process occurred in the decode stage 3B, can activate or not one, more or none of the combinatorial module 9 implemented in each stage of the pipeline.

The computing platform 1 comprises a plurality digital logic means 10 interconnected to each other's and configured for generating random values or program data values.

In particular, the plurality of digital logic means 10 are in communication signal with the plurality of data input of the combinatorial module 9, so as when the program instruction travelling from the left to right if the pipeline enters one stage of said plurality of stages 3A, 3E, all the combinatorial modules of said that stage that are not activated by the program instruction will have their input data fed with said random values and all the combinatorial modules of said that stage that are activated by the program instruction will have their unused data input fed with said random values and their used data inputs fed with said program data values.

In other words, the computing platform 1 ensures that, for each pipeline stage, all the data wires of the pipeline stage that are not used to process the instruction are driven with clean data when the instruction enters said pipeline stage.

It is worth noticing that an unused combinatorial module 9 has all its data input unused and thus those signals must be driven with clean data values.

It is to be noted that for best assuring the computing platform 1 against side channel attacks, when the data inputs of the combinatorial modules 9 are shared between two or more combinatorial modules, the data inputs are split into different sets of data inputs dedicated to each combinatorial module.

In order to better explain this feature, it is possible to make reference to FIG. 4A-4C.

FIGS. 4B and 4C show the generic scheme of two combinatorial modules, i.e., comb1 and comb2, where the shared data inputs, i.e. A and B, of FIG. 4A have been physically decoupled.

By having two set of independent signals to drive values to each combinatorial module, if a module is not used all its inputs are driven with clean values and thus the glitch behavior serializes random data which contain no side-channel information leakage.

In contrast, if one data input is not used in a combinatorial module, such input data is driven with a random value.

To this end, the glitch behavior, that is still present, will eventually serializes a program data interleaved with the random value.

Since the actual clean data is time dependent, the serialization of the same program data happens each time with a different random value, thus preventing any side-channel information leakage.

It is worth noticing that the action of decoupling is effective either if the input data are decoupled in a way that i) two sets of primary inputs to the top module of the design are generated (FIG. 4B) or ii) there is at least one sequential element that separately drives the already decoupled signals (FIG. 4C).

In particular, again with reference to FIG. 4B, such FIG. 4B shows a correct decoupling for the generic scheme of two combinatorial modules described in FIG. 3A by means of creating additional primary inputs in the top module of the design.

Considering the design hierarchy, the top module is the root module in the computing platform the one that is visible to the outside world. The input and output signals of the top module are called primary inputs and primary outputs, respectively.

In particular, with FIG. 4C, such FIG. 4C shows a correct decoupling for the generic scheme of two combinatorial modules described in FIG. 4A by means of a decoupling action that allows to have at least one sequential elements that drives the already decoupled inputs to the corresponding combinatorial modules comb1 and comb2.

According to an embodiment, the plurality of digital logic means 10 comprises:

a cleaner generator CG configured for generating a value for driving an ID.imm signal, the register addresses of a protected register file PRF and control signals for driving the CPU back end stages so as to force when said program instruction enters one stage of said plurality of stages, all the combinatorial modules of said that stage that are not activated by the instructions will have their input data fed with said random values and all the combinatorial modules of said that stage that are activated by said program instruction will have their unused data input fed with said random values and their used data inputs fed with said program data values;

the protected register file PRF implements a register file according to the Boolean masking scheme with two shares to provide a pair of data signals for each of its read out data values;

a GetDataVal block that is configured for performing the
Boolean exclusive or between each pair of signals read
out from the protected register file PRF;

a resSel block and a FwdM2Ex block that allow to
independently drive either the value produced by a
combinatorial block in one of the stage of the pipeline
or a random value to each combinatorial module 9 that
may use such produced value.

Figure 5:
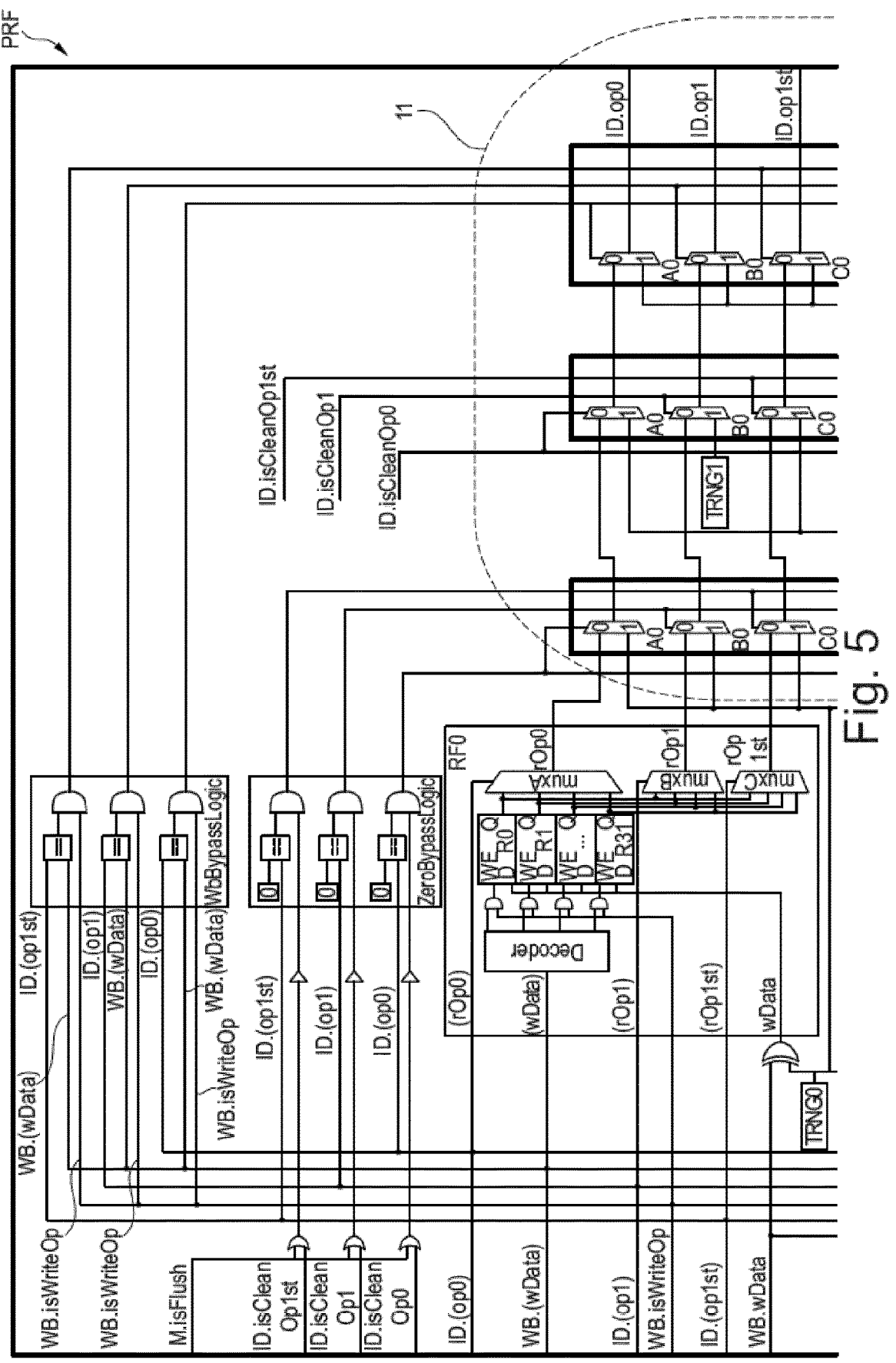
FIG. 5 shows the architectural view of the protected register file (PRF) of the computing platform of FIG. 3, according to the present disclosure.
Figure 5:
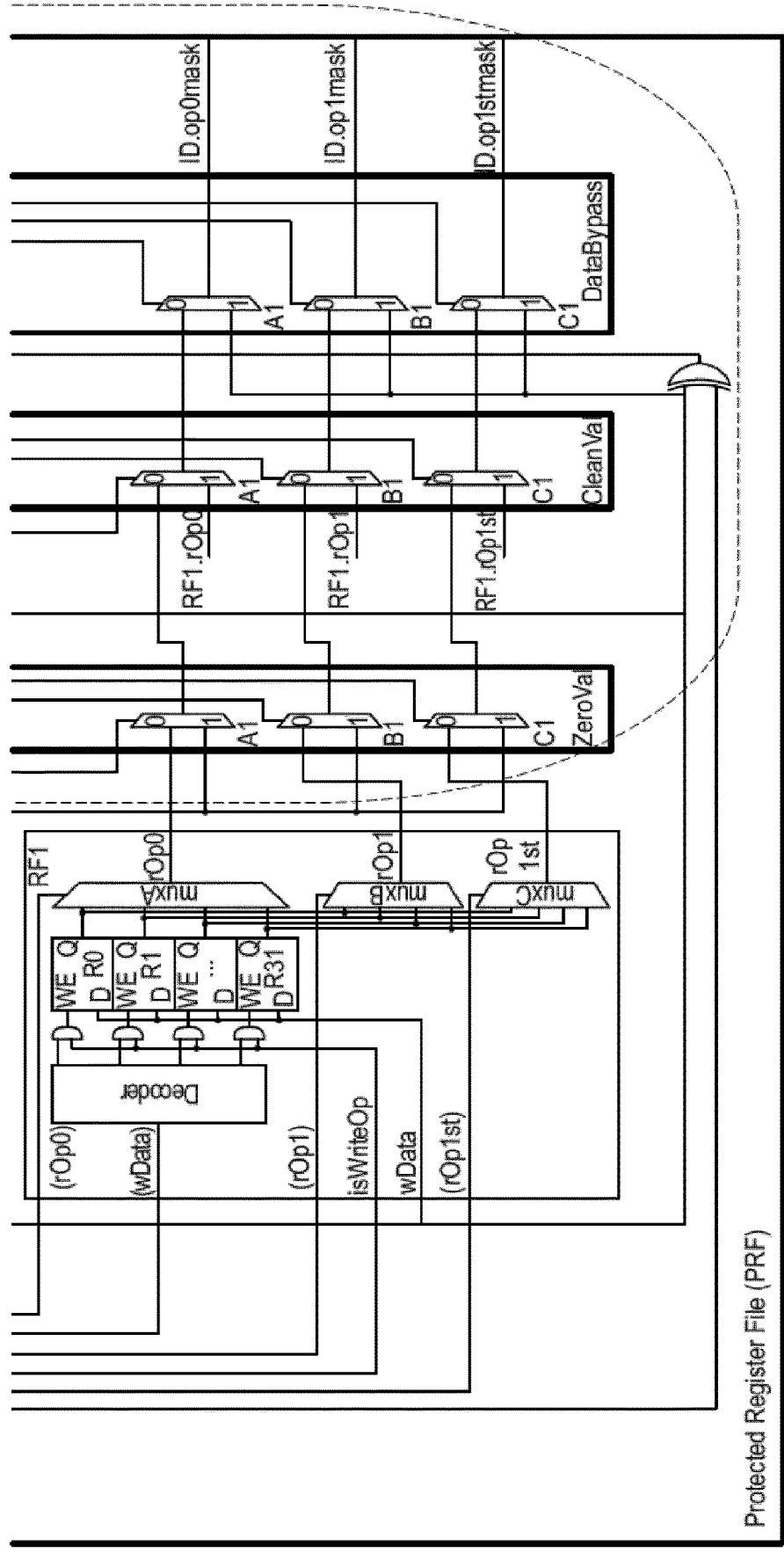

With reference to FIG. 5, a possible embodiment of the
protected register file PRF is shown.

The PRF comprises a read out block 11 having a chain of
multiplexers ZeroVal, CleanVal, Databypass that allows to
encode on each pair of signals two values for which the
Boolean exclusive-or operation applied to such pair of
signals results in either a zero value, a random value or a
program data value, said each pair of signals can generate
one of these values independently from the others and
without breaking the semantic of the executed program.

The protected register file PRF comprises a true number
generator TRNG0 and a true number generator TRNG1.

Now with reference to FIG. 3, the cleaner generator CG
comprises a true number generator CG.TRNG, the block
resSel and the block FwdM2Ex comprise a true number
generator TRGN2.

Further also the memory 2 comprises a true number
generator MEM.TRNG.

It is to be noted that all said true number generators
CG.TRNG, TRNG0, TRNG1, TRGN2 and MEM.TRNG are
configured for generating random values.

The combinatorial module 9 of computing platform 1
comprises:

a ALU combinatorial module operates on two operands
and the ALU combinatorial module is used to perform
logic and arithmetic instructions, to compute the
memory address for instructions (i.e. store and load
instructions), and to evaluate the condition for condi-
tional branch instructions, a first multiplexer (or mux) MUX1 and a second mux
MUX2 that are used to drive the values of the first and
the second operand to the ALU combinatorial module;

a third mux MUX3 that is used to drive the value to be
written in the memory (2);

an ALU branch is used to compute the branch target
address, said ALU branch is used to change the control
flow of the program, (i.e., branching to a new program
counter, depending on the value of the condition in the
branch instruction);

a LSU is used to perform load and/or store instructions, so
as to read and/or write data values, both program as
well as random ones, from and to said memory 2;

a fourth mux MUXA is used to select between the value
produced by said ALU and the one loaded from the
memory via the LSU;

a fifth mux MUXB is used to select either the output of the
third mux MUX3 or the data value, i.e., either a random
data or a program data one, from the WB stage.

According to an aspect the third mux MUX3 is used by
the LSU to process a Store instruction.

More in detail and with reference to FIG. 3, the protected
version of the pipeline ensures that for each multiplexer at
most one data value is fed in input while all the other data
inputs are fed with random values.

In addition to the standard wires to drive the readout and
store of program data values into the register file, the
cleanerGenerator CG also drives three more control signals
into the PRF, i.e., ID.isCleanOp0, ID.isCleanOp1, and
ID.isCleanOp1st.

Such signals are employed to signal the PRF to produce
a clean value for the corresponding read out operand, i.e.
op0, op1, or op1st, respectively.

The control signals as well as the entire pipeline and PRF
design allow to independently force to clean one, more, all,
or none of the operands produced by the PRF.

It is to be noted that the GetDataVal block, depending if
the instruction is an ALU or an LSU one, the RF.op1 can be
used by either the ALU or the LSU.

No ISA instruction requires the use of RF.op1 for both the
ALU and the LSU.

To this end, the PRF split ID.op1 into ID.op1 and
ID.op1st.

For each split signal the corresponding mask is associ-
ated, i.e., ID.op1Mask and ID.op1stMask, to allow retriev-
ing the data value EX.op1 and EX.op1_LSU, respectively, to
be used in the EX stage by means of a Boolean xor (see
GetDataVal in FIG. 3).

In addition the PRF propagates ID.op0 and ID.op0mask to
allow retrieving the corresponding EX.op0 data value to be
used in the EX stage by means of a Boolean xor (see
GetDataVal in FIG. 3).

It is to be noted that the in the M stage 3D for the MUX
A and resSel block, the output of the ALU can be used by
different consumers, i.e., either the LSU, the Branch or it is
bypassed through the M stage.

For each consumer a different data input is used, i.e.,
M.branchRes for the Branch combinatorial module,
M.aluRes for the bypass in the M stage (see data input 0 of
MUXA), and M.adrLsu for the LSU. Such design allows to
independently drive the output of the ALU or a random
value in the case the consumer is not used.

In addition, MUXA in the M stage 3D collects such value
as well as the output from the LSU, i.e., any eventually
loaded program data value.

To this end, M.aluRes must be randomized if the output
of the ALU is used as the address for a load store operation.

Otherwise, the value entering the LSU as the address for
a load/store, i.e., M.adrLsu, must be randomized. Such
action is performed by the resSel block in the EX stage 3C.

It is to be noted that in the M stage 3D the FwdM2EX
block, and considering the output to the MUXA multiplexer,
the FwdM2EX block allows to selectively substitute any
program data value with a clean value for three wires
corresponding to the M/EX forwarding path for op0, op1
and op1st in the EX stage 3C (see M/WB.op1_LSU,
M/WB.op1 and M/WB.op0).

Each of those signals, i.e., M/WB.op1_LSU, M/WB.op1
and M/WB.op0, that is not used in the EX stage 3C is driven
with a clean value.

In other words, the M/WB.op1_LSU, M/WB.op1 and
M/WB.op0 are driven, independently one to the others, with
a random data when are not used in the EX stage 3C.

It is to be noted that the in the M stage 3D, the design of
mux MUXB leverages the principle of interleaving a clean
instruction between two consecutively executed program
instructions to guarantee that at most one of its inputs is
driven with a program data value. In fact, the WB.wData
always drives a clean value when M.op1 can possibly drive
a program data value. In particular, the mux MUXB data
input 1 is never used in the protected pipeline.

It is to be noted that the design mux MUX1, MUX2,
MUX3 in the EX stage 3C, the leverages the principle of
interleaving a clean instruction between two consecutively
executed program instructions to guarantee that when any
input but the EX/M.ex2ex is driven with a program data
value, the EX/M.ex2ex input is always driven with a random value. In particular, the EX/EX forwarding path, via the EX/M.ex2ex signal, is never used in the protected pipeline.

It is to be noted that the value EX.imm is designed to be shared between the ALU and the ALUbranch.

In particular, the design drives both the immediate ALU and the ALU branch using a single shared data input signal, i.e., EX.imm, leveraging the fact that the immediate is a constant encapsulated into the instruction.

To this end the immediate is not considered a proper program data value, since there is no way to change its value across different executions of the same binary. To change its value the only option is to change it in the program source and recompile to obtain a new binary.

Now with reference to FIG. 5, the Protected Register File implements the same semantic of the classical RF avoiding side-channel information leakage by means of glitches.

Two banks of registers RF0 and RF1 are implemented in the PRF.

For each register R in the classical register file RF, the PRF offers two memory locations RF0.R and RF1.R where each of them has the same width of RF.R.

According to an aspect for a store program data into the PRF, the PRF requires a triplet of values to correctly store an incoming program data value, either a program data value or a random value. WB.(wData) identifies the address in the PRF where the data must be written; WB.wData is the actual data value (either program data value or random value), and WB.isWriteOp signals if the data value must be actually written.

Starting from the data value WB.wData to be written in the R address of the PRF and the RNG generated by the TRNG module, two values A and B are produced according to the following Boolean expressions:

A=WB.wData XOR RNG

B=RNG

Then a A is written to RF0.R and B is written to RF1.R.

To this end, the HD between the overwritten and the written data values cannot lead to side-channel information leakage because both the written and the overwritten data values are randomized.

According to an aspect for a program data read out from the PRF, for each decoded instruction, either program or clean instruction, the PRF has to read out the values from three addresses ID.(op0) and ID.(op1), and ID.(op1st).

As stated before, the PRF implements a chain of multiplexer stages 11 to address in a glitch-free fashion the read-out of the requested data values.

In particular, the cleaner generator CG asks the PRF to provide data values corresponding to three register addresses, i.e., ID.(op0), ID.(op1), and ID.(op1st).

While each ISA instruction requires at most two operands from the register file, i.e. op0 and op1, the op1 request is split between ID.(op1), and ID.(op1st) to provide physically split program data values to the ALU and the LSU.

To this end the PRF outputs three data values corresponding to the requested input signals ID.(op0), ID.(op1), and ID.(op1st).

According to the Boolean masking encoding scheme employed in the PRF, i.e., for each write into R register both RF0.R and RF1.R are written, each output data value is encoded using two separate data signals coming, respectively. In particular, the value for the requested register address ID.(op0) is driven by the RF0.rOp0, RF1.rOp0 pair of signals, the value for the requested register address ID.(op1) is driven by the RF0.rOp1, RF1.rOp1 pair of signals, and the value for the requested register address ID.(op1st) is driven by the RF0.rOp1st, RF1.rOp1st pair of signals.

To obtain the actual data value used in the EX, M and WB stages, the GetDataVal performs the Boolean xor between each pair of signals, i.e., RF0.rOp0 xor RF1.rOp0, RF0.rOp1 xor RF1.rOp1, and RF0.rOp1st xor RF1.rOp1st, to obtain EX.op0, EX.op1, and EX.op1_LSU, respectively.

The design must ensure the possibility of independently driving each one among EX.op0, EX.op1, and EX.op1_LSU either with a zero value, a program data value or a random value.

To achieve such behavior, the PRF implements a chain of three multiplexers to correctly drive the value on each of its (the PRF) six output signals, i.e., ID.op0, ID.op0mask, ID.op1, ID.op1mask, ID.op1st, ID.op1stmask.

Each of the six data outputs is generated by traversing three dedicated multiplexers in the ZeroVal, CleanVal, and DataBypass blocks. The selectors of the multiplexers pertaining to the pairs of values for which the Boolean xor is performed in the GelDataVal block (see Ex stage FIG. 3) are driven with the same value.

For example A0 and A1 multiplexers in the ZeroVal are driven with the same control signal and contribute to the data value of the pair ID.op0 ID.op0mask.

According to an aspect, the multiplexers in the ZeroVal block are used to force each pairs of output signals, i.e., ID.op0-ID.op0mask, ID.op1-ID.op1mask, and ID.op1st-ID.op1stmask, to be driven in such a way that the output of the Boolean xor, i.e., the operation in the GetDataVal block, is a zero value.

To achieve such goal the same random value generated by the TRNG0 is driven on both the multiplexers of a paired values, i.e., A0-A1, B0-B1, and C0-C1.

For example to produce a zero value to the EX.op0, the A0 and A1 multiplexers in the ZeroVal block are driven with the same RNG value from the TRNG0 and the subsequent multiplexers A0 and A1 in the CleanVal and DataBypass blocks are driven to let values propagate to ID.op0 and ID.op0mask, i.e., by selecting the data input 0 of the multiplexer.

According to an aspect, the multiplexers in the CleanVal block are used to force each pairs of output signals, i.e., ID.op0-ID.op0mask, ID.op1-ID.op1mask, and ID.op1st-ID.op1stmask, to be driven in such a way that the output of the Boolean xor, i.e., the operation in the GetDataVal block, is a random value.

To achieve such goal the pair of signals, for which such behavior is requested, are driven with an RNG from the TRNG0 or TRNG1 and the value from the RF1.

The value of RF1 always corresponds to a RND value due to the write semantic of the PRF. For example to drive a random value to EX.op0, multiplexer A0 in the CleanVal block, i.e., the one that participates to the creation of the ID.op0 value, drives the RNG from TRNG0 while the A1 multiplexer in the same CleanVal block, i.e., the one that participates to the creation of the ID.op0mask value, drives the RF1.rOp0 value that is an RNG.

To ensure that the cleaner instruction in the form xor R0, R0, R0 operates on two different random to produce a new random value, a different random value, i.e., RNG from TRNG0, is driven from the B0 multiplexer in the CleanVal block, while the B1 multiplexer in the CleanVal block drives RF1.rOp1.

To this end EX.op0 value is generated by the formula XOR(TRNG0,RF1.0) while EX.op1 value is obtained by the formula XOR(TRNG1,RF1.0) and the two values are random and different, thus their Boolean xor produces a new random value.

The multiplexers in the DataBypass block are used to force each pairs of output signals, i.e., ID.op0-ID.op0mask, ID.op1-ID.op1mask, and ID.op1st-ID.op1stmask, to be driven in such a way that the output of the Boolean xor, i.e., the operation in the GetDataVal block, is the data that is being written into the PRF at the time of the PRF read out, i.e., WB.wData.

To ensure a glitch-free behavior, the WB.wData is xor-ed with an RNG value from TRNG0 and driven to the one data output signal, while the RNG value is driven to the corresponding output of the pair.

For example, if the currently written WB.wData must be forwarded to be used by the EX.op0 in the EX stage, in the PRF the result of the Boolean xor between the WB.wData and the RNG from the TRNG0 is driven to the ID.op0 via the A0 multiplexer in the DataBypass block, while the RNG is driven to ID.op0mask via the A1 multiplexer in the DataBypass block.

For each output signal, i.e., RF0.rOp0, RF1.rOp0RF0.rOp1, RF1.rOp1RF0.rOp1st, RF1.rOp1st, of the PRF, three multiplexers are used in a way that considering at the same time all the inputs on the three multiplexers a single data input is driven with a program data value at most. In particular, the use of the Boolean masking to store the program data values into the PRF allows to consider each output from both the RF0 and RF1 as a random value, until when the Boolean xor between the two values is performed and thus one among a zero value, a program data value or a random value is revealed.

According to an aspect of the present disclosure the plurality digital logic means 10 are configured for generating cleaner instruction.

Each cleaner instruction is interleaved between each pair of program instructions that are consecutively executed, to ensure that each stage 3B-3E of the pipeline traversed by the cleaner instruction has its combinatorial module 9 and memory elements 2 fed by the random values.

In other word, from the semantic viewpoint, the cleaner instruction traverses the entire CPU pipeline without using any functional unit.

As stated, before the protected register file PRF requires a triplet of values to correctly store an incoming program data value, either a program data value or a random value.

One of these triplet of values is WB.(wData) which identifies the address in the PRF where the data must be written; the other is WB.wData that is the actual data value (either program data value or random value), and the last is WB.isWriteOp signals if the data value must be actually written.

According to an aspect, when a store program instruction is decoded in the decoding stage 3B, said cleaner generator CG creates two additional cleaner instructions that are executed just before the store one, the first of said two additional instructions is a cleaner one and the second is a cleaner store that stores a random value at the same address of the store program instruction.

According to an aspect, when a flush of the CPU 6 pipeline is required due to a taken branch instruction, a jump instruction, an exception or an interrupt, the cleaner instructions are used in place of the nop instruction.

According to an aspect, when executed instruction is a load LD or a store ST instruction, the additional cleaner instructions are used to remove the data serialization problem on the data bus 4, according to the following scheme:

{LD→CleanerInstruction|CleanerLoad|Load|Cleaner-Load|CleanerInstruction}
or
{ST→CleanerInstruction|CleanerStore1|Store|Cleaner Store2|CleanerInstruction}
whereas:
the cleanerLoad performs a load operation to retrieve the value located at memory address zero of said memory module 2,
the cleanerStore1 performs a store of a random value at the same memory address of the store instruction ST,
the cleanerStore2 performs a store of a random value at the memory address 0 of said memory module 2.

According to an aspect, when a load instruction from address zero of the memory module 2 always returns a random data and a store instruction to address zero of the memory module 2 always writes a data that can never be loaded thereafter.

Considering the proposed architecture, the cleanerInstruction is generated in the ID stage and implemented as the ISA instruction xor R0, R0, R0, i.e., perform the Boolean xor between two random values and store the result in R0.

The cleanerGenerator drives ID.we=1, ID.isCleanOp0=1, ID.isCleanOp1=1, ID.isCleanOp1st=1, ID.isImmInsn=CG.TRNG, the ID.opCode="xor", ID.(wData)=R0. To this end the CPU back-end is driven with all random values. By forcing ID.isCleanOp0=1, ID.isCleanOp1=1, the PRF generates two random values for op0 and op1, that are different one from each others.

For the instruction CleanerLoad, and considering the proposed computing platform 1 shown in FIG. 3, the cleanerLoad instruction is generated in the stage 3B (i.e. the ID stage) and implemented as the ISA instruction LD R0, R0, 0, i.e., to load from memory address zero and write such value into the register R0 of RF0 and RF1 of the protected register file PRF.

The cleanerGenerator CG drives ID.we=1, ID.isCleanOp0=0, ID.isCleanOp1=1, ID.isCleanOp1st=1, ID.isImmInsn=immExt, the ID.opCode="load", ID.(wData)=R0.

To this end the CPU back-end performs a load from address zero of the memory 2 while all the unused data inputs are driven to random values.

For the instruction CleanerStore1, considering the proposed computing platform 1 shown in FIG. 3, a program store instruction ST Rdest, Radr, adrOffset to be performed, the cleanerStore1 instruction is generated in the stage 3B (i.e. the ID stage) and implemented as the ISA instruction ST R0, Radr, adrOffset, i.e., to store a random value to the memory address where the considered program store instruction is willing to write.

The cleanerGenerator CG drives ID.we=0, ID.isCleanOp0=0, ID.isCleanOp1=1, ID.isCleanOp1st=1 to logic "1", ID.isImmInsn=immExt, the ID.opCode="store", ID.(wData)=R0.

To this end the CPU back-end performs a store to the memory address where the considered program store instruction is willing to write, and all the unused data inputs are driven to random values.

For the instruction CleanerStore2, considering the proposed computing platform 1 shown in FIG. 3, the cleanerStore2 instruction is generated in the stage 3B (i.e. the ID stage) and implemented as the ISA instruction ST R0, R0, 0, i.e., to store a random value to the memory address zero.

The cleanerGenerator CG drives ID.we=0, ID.isCleanOp0=0, ID.isCleanOp1=1, ID.isCleanOp1st=1, ID.isImmInsn=immExt, the ID.opCode="store", ID.(wData)=R0.

To this end the CPU back-end performs a store of a random value to the memory address zero and all the unused data inputs are driven to random values.

Those skilled in the art will obviously appreciate that several changes and variants may be made to the arrangements as described hereinbefore to meet incidental and specific needs. All these variants and changes fall within scope of the disclosure, as defined in the following claims.

The invention claimed is:

1. A computing platform—for preventing side channel attacks comprising:

a memory module configured for storing data of a computer program and program instructions;

a CPU configured for executing said computer program;

a pipeline having a plurality of stages integrated in said CPU, said plurality of stages being configured for transferring electrical signal via an on-chip interconnect bus;

said program instructions being decoded by one stage of said plurality of stages;

each stage of said pipeline having at least one combinatorial module, said at least one combinatorial module having a plurality of data input and a plurality control input and at least a data output;

each program instruction traveling from left to right through said pipeline, and within each stage can activate one or more or none of said at least one combinatorial module;

wherein the pipeline comprises a plurality digital logic means interconnected to each other and configured for generating random values or program data values in a clock cycle, said plurality of digital logic means being in communication signal with said plurality of data input of said combinatorial module, so as when said program instruction enters one stage of said plurality of stages, all the combinatorial modules of said that stage that are not activated by the program instruction will have their input data fed with said random values and all the combinatorial modules of said that stage that are activated by said program instruction will have their unused data input fed with said random values and their used data inputs fed with said program data values, and wherein when said data inputs of said combinatorial modules are shared between two or more combinatorial modules said data inputs are split into different sets of data inputs dedicated to each combinatorial module to allow independently driving on each of them a random value, a program data value or a zero value.

2. The computing platform according to claim 1, wherein said plurality of stages comprises a decoding stage configured for decoding said program instruction, an execution stage configured for executing said decoded program instruction and a mem stage—configurated for storing said executed program instruction and a write back stage, said CPU comprises a front end and a back end;

said plurality of digital logic means comprises:

a cleaner generator configured for generating a value for driving an immediate signal, register addresses of a protected register file and control signals for driving the back end stage—of said CPU so as to force when said program instruction enters one stage of said plurality of stages, all the combinatorial modules of said that stage that are not activated by the instructions will have their input data fed with said random values and all the combinatorial modules of said that stage that are activated by said program instruction will have their unused data input fed with said random values and their used data inputs fed with said program data values;

said protected register file implements a register file according to the Boolean masking scheme with two shares to provide a pair of data signals for each of its read out data values;

a first logic block configured for performing the Boolean exclusive or between each pair of signals read out from the protected register file; and a second logic block and a third logic block allow to independently drive to each combinatorial module that may use such produced value either the value produced by a combinatorial module in one of the stage of the pipeline or a random value.

3. The computing platform according to claim 2, wherein protected register file comprises two banks of registers, wherein each bank of registers comprises two memory locations, wherein each memory location has the same width of a register, a read out block having a chain of multiplexers that allows to encode on each pair of signals outputted from said two banks of registers two values—for which the Boolean exclusive-or operation applied to such pair of signals results in either a zero value, a random value or a program data value, said each pair of signals can generate one of these values independently from the others and without breaking the semantic of the executed program.

4. The computing platform according to claim 2, wherein said cleaner generator comprises a first true number generator, said protected register file comprises a second true number generator and a third true number generator, said second logic block- and a third logic block comprises a fourth true number generator, said memory module comprises a fifth true number generator, said first, second, third, fourth and fifth true number generators are configured for generating random values.

5. The computing platform according to claim 1, wherein said combinatorial module comprises:

a first Arithmetic Logic Unit module that operates on two operands and said first Arithmetic Logic Unit module is used to perform logic and arithmetic instructions, to compute the memory address for instructions, and to evaluate the condition for conditional branch instructions, a first mux and a second mux that are used to drive the values of the first and the second operand to said first Arithmetic Logic Unit module combinatorial module;

a third mux that is used to drive the value to be written in the memory module;

a second Arithmetic Logic Unit module that is used to compute the branch target address, said second Arithmetic Logic Unit module is used to change the control flow of the program;

a Load Store Unit that is used to perform load and/or store instructions, so as to read and/or write data values, both program as well as random ones, from and to said memory;

a fourth mux is used to select between the value produced by said ALU and the one loaded from the memory via the LSU; and a fifth mux is used to select either the output of said third mux or the data value, being either a random data or a program data one, from said write back stage.

6. The computing platform according to claim 1, wherein said plurality digital logic means are configured for generating cleaner instructions, each cleaner instruction being interleaved between each pair of program instructions that are consecutively executed, to ensure that each stage of the pipeline traversed by the cleaner instruction has its combinatorial module and memory elements fed by said random values.

7. The computing platform according to claim 6, said protected register file requires a triplet of values to correctly store an incoming program data value either a program data value or a random value, whereas the first of said triplet identifies the address in the PRF where the data must be written, the second of said triplet is the actual data value either program data value or random value, and the third of said triplet signals if the data value must be actually written.

8. The computing platform according to claim 6, when a store program instruction is decoded in the decoding stage, said cleaner generator creates two additional cleaner instructions that are executed just before the store one, the first of said two additional instructions is a cleaner one and the second is a cleaner store that stores a random value at the same address of the store program instruction.

9. The computing platform according to claim 6, when a flush of the CPU pipeline is required due to a taken branch instruction, a jump instruction, an exception or an interrupt, the cleaner instruction is used in place of the nop instruction.

10. The computing platform according to claim 6, where said computing platform generates a nop instruction, said cleaner instruction is used in place of the nop instruction.

11. The computing platform according to claim 6, wherein the executed instruction is a load or a store instruction, additional cleaner instructions are used to remove the data serialization problem on the data bus, according to the following scheme:

{load→cleaner|cleanerLoad|load|cleanerLoad|cleaner}
or
{store→cleaner|cleanerStore1|store|cleanerStore2|cleaner},
whereas:

said cleaner is a cleaner instruction said cleanerLoad performs a load operation to retrieve the value located at memory address zero of said memory module, said cleanerStore1 performs a store of a random value at the same memory address of the ST, said cleanerStore2 performs a store of a random value at the memory address 0 of said memory module.

12. The computing platform according to claim 11, wherein a load instruction from address zero of the memory module always returns a random data and a store instruction to address zero of the memory module always writes a data that can never be loaded thereafter.

13. A computing platform—for preventing side channel attacks comprising:

a memory module configured for storing data of a computer program and program instructions;

a CPU configured for executing said computer program;

a pipeline having a plurality of stages integrated in said CPU, said plurality of stages being configurated for transferring electrical signal via an on-chip interconnect bus;

said program instructions being decoded by one stage of said plurality of stages;

each stage of said pipeline having at least one combinatorial module, said at least one combinatorial module having a plurality of data input and a plurality control input and at least a data output;

each program instruction traveling from left to right through said pipeline, and within each stage can activate one or more or none of said at least one combinatorial module;

wherein the pipeline comprises a plurality digital logic means interconnected to each other and configured for generating random values or program data values in a clock cycle, said plurality of digital logic means being in communication signal with said plurality of data input of said combinatorial module, so as when said program instruction enters one stage of said plurality of stages, all the combinatorial modules of said that stage that are not activated by the program instruction will have their input data fed with said random values and all the combinatorial modules of said that stage that are activated by said program instruction will have their unused data input fed with said random values and their used data inputs fed with said program data values, and wherein said combinatorial module comprises:

a first Arithmetic Logic Unit module that operates on two operands and said first Arithmetic Logic Unit module is used to perform logic and arithmetic instructions, to compute the memory address for instructions, and to evaluate the condition for conditional branch instructions, a first mux and a second mux that are used to drive the values of the first and the second operand to said first Arithmetic Logic Unit module combinatorial module;

a third mux that is used to drive the value to be written in the memory module;

a second Arithmetic Logic Unit module that is used to compute the branch target address, said second Arithmetic Logic Unit module is used to change the control flow of the program;

a Load Store Unit that is used to perform load and/or store instructions, so as to read and/or write data values, both program as well as random ones, from and to said memory;

a fourth mux is used to select between the value produced by said ALU and the one loaded from the memory via the LSU; and a fifth mux is used to select either the output of said third mux or the data value, being either a random data or a program data one, from said write back stage.

14. A computing platform—for preventing side channel attacks comprising:

a memory module configured for storing data of a computer program and program instructions;

a CPU configured for executing said computer program;

a pipeline having a plurality of stages integrated in said CPU, said plurality of stages being configurated for transferring electrical signal via an on-chip interconnect bus;

said program instructions being decoded by one stage of said plurality of stages;

each stage of said pipeline having at least one combinatorial module, said at least one combinatorial module having a plurality of data input and a plurality control input and at least a data output;

each program instruction traveling from left to right through said pipeline, and within each stage can activate one or more or none of said at least one combinatorial module;

wherein the pipeline comprises a plurality digital logic means interconnected to each other and configured for generating random values or program data values in a clock cycle, said plurality of digital logic means being in communication signal with said plurality of data input of said combinatorial module, so as when said program instruction enters one stage of said plurality of stages, all the combinatorial modules of said that stage that are not activated by the program instruction will have their input data fed with said random values and all the combinatorial modules of said that stage that are activated by said program instruction will have their unused data input fed with said random values and their used data inputs fed with said program data values, and wherein said plurality digital logic means are configured for generating cleaner instructions, each cleaner instruction being interleaved between each pair of program instructions that are consecutively executed, to ensure that each stage of the pipeline traversed by the cleaner instruction has its combinatorial module and memory elements fed by said random values.

*   *   *   *   *